United States Patent Office 3,108,891
Patented Oct. 29, 1963

3,108,891
AMYLACEOUS FORMING SIZE COMPOSITIONS
Clarence W. Charon, Attleboro, Mass., and Laurent C. Renaud, Cumberland, R.I., assignors to Owens-Corning Fiberglas Corporation, a corporation of Delaware
No Drawing. Filed Apr. 24, 1961, Ser. No. 104,841
8 Claims. (Cl. 106—213)

This invention relates to amylaceous size compositions and particularly to migration resistant, low cooking, forming size compositions for fibrous glass, which consist essentially of amylopectin and hydroxyethylated amylose.

Due to the characteristic of mutual abrasion which is inherent in glass fibers, it is necessary to apply a size composition to the fibers immediately subsequent to their formation, and prior to their exposure to the abrasion conducive conditions of basic processing. Such compositions, termed forming size compositions, contain as a principal ingredient a film-forming material which serves to provide a protective, abrasion resistant sheath about the fibers. In addition, such compositions conventionally contain such additives as lubricants, plasticizers, emulsifiers and the like. The coating provided is maintained throughout the basic processing phases such as forming, grouping, winding, twisting and plying, when a highly abrasive conducive condition is extant due to the frequent contact of the fibers with one another and with sundry guides, eyes, contact points, bearing surfaces and tensioning means. In the absence of such a protective medium the fibrous glass strands which are formed, are so extensively damaged due to abrasion, as to render the product substantially valueless, and unprocessable.

While the film forming ingredient of the forming size composition may comprise a synthetic or natural resin or gelatin, conventional starches or chemically modified starches have long remained the favored film formers, due to superior film forming characteristics, economy and ease of removal prior to advanced processing when the forming size compositions prove incompatible with requisite thermal conditions, finishing compositions or laminating resins or matrices.

However, despite the desirable attributes of amylaceous based forming size compositions, such materials are plagued by two major impediments in the form of solids migration to the fibrous package exterior and the expense of requisite cooking methods and apparatus.

The migration phenomenon is experienced subsequent to the winding of the fibers or fibrous strands in the conventional storable cylindrical package and during the phase of the drying of the applied size compositions. The phenomenon comprises the physical transfer or migration of the majority of the solid material embodied in the size composition, to the exterior surface of the wound package. While the precise cause of such migration has not been exactly determined, capillarity or the entrainment of the solids in the vapor phase as it passes to the atmosphere and their ultimate deposition upon the package surface, are believed to comprise the culpable factors.

The undesirable results of migration are realized primarily by the weaver, who derives "color-banded" fabrics when migration affected fiibrous glass strands or yarns are incorporated in his product. Such defects are accrued due to the necessity for the weave setting or heat crimping of fibrous glass fabrics, wherein the fabrics are exposed to temperatures in excess of 1000° F. in order to set or crimp the fibers in their woven relationship. When an excess of size solids is present upon segments of the fabric, i.e., the migration affected fibers, the high temperatures employed serve to carbonize or caramelize such excessive solids with the consequent occurrence of darkened areas which impart a highly undesirable, variegated or "color-banded" appearance to the fabric.

In addition, the high solids areas often act as heat sinks or areas of heat concentration which bring about the fusion of adjacent fibers, despite the fact that the treating temperatures are maintained at a level adequate to soften the glass fibers but beneath the fusion point of the fibers.

Furthermore, high solids concentrations result in a product possessing non-uniform tension characteristics which are incompatible with advanced processing. For example, weaving entails close tension control and deviations in the tension characteristics of the yarn being woven result in loom stoppage, yarn breaks and the presence of an undesirable amount of fuzz or projecting broken filament ends, upon the surface of the yarns.

The gravity of the migration product and the unacceptability of migration affected yarns to the weaver, is demonstrated by the fact that the previous practice in the fabrication of yarns sized with an amylaceous based composition, has been the withdrawal and discarding of the outermost 1200 yards of strand, from the wound package. It is readily apparent that the rejected yarn which was involved would annually total millions of yards.

An additional, although unrelated, drawback entailed in the utilization of starch based forming size compositions, is the expense, time and necessity for close control which is involved in the cooking of such materials. In addition, expensive and frequently cumbersome apparatus such as pressurized kettles and jet type cookers are often necessitated.

It is an object of the present invention to provide amylaceous based size compositions which are free from a solids migration tendency and which may be cooked at moderate temperatures.

A further object is the provision of fibrous glass elements sized with amylaceous based compositions and free from the harmful effects of solids migration.

The foregoing objects are achieved by means of forming size compositions which consist essentially of amylopectin and hydroxyethylated amylose, and also contain a non-ionic and a cationic lubricant. Various optional additives such as emulsifiers, surfactants and additional film formers and lubricants may also be incorporated.

The ingredients of the size compositions of the invention are employed in the following proportional ranges which are expressed in percentages by weight:

| | Percent |
|---|---|
| Amylopectin | 1–5 |
| Hydroxyethylated amylose | 1–5 |
| Non-ionic lubricant | 0.5–3.0 |
| Cationic lubricant | 0.1–2.0 |
| Water | Remainder |

A preferred formulation is embodied in the following example where in quantities of ingredients are expressed in percentages by weight:

*Example*

| | Percent |
|---|---|
| Amylopectin | 2 |
| Hydroxyethylated amylose | 2 |
| Hydrogenated vegetable oil | 2 |
| Polyoxyethylene sorbitan monooleate emulsifier | 0.2 |
| Tetraethylene pentamine distearate | 0.5 |
| Polyethylene glycol | 0.5 |
| Water | Remainder |

The above ingredients were formulated by placing one half of the total amount of water employed in a jacketed kettle maintained at 80–100° F. adding the hydroxyethylated amylose and heating the mixture to 200° F. with agitation. The solution is then cooled to 160° F. and the amylopectin is added thereto. The vegetable oil and emulsifier are then placed in a separate receptacle and water at a temperature of 160° F. is added until the emulsion is inverted and is then subjected to homogenization at 1000 p.s.i. In a third receptacle, the tetraethylene pentamine distearate and polyethylene glycol are dissolved in warm water. The three mixes are then admixed with agitation and the remainder of the water is added. The polyoxyethylene ester is employed to facilitate the emulsification of the vegetable oil.

The starch fractions employed are derived by means of the fractionation of conventional starches such as potato, corn and maize starches and the like, as disclosed by U.S. 2,829,987, 2,829,988, 2,829,989 and 2,829,990. These materials are the normal dual constituents of conventional starches and comprise amylopectin, the branched starch fraction which makes up to outer shell of starch granules and has the formula:

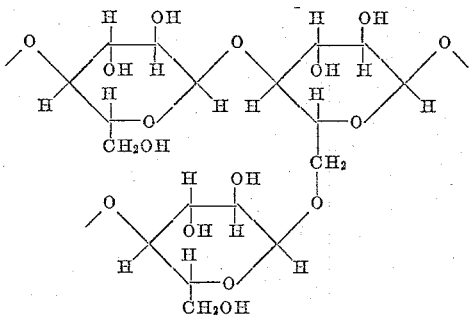

and amylose, the straight chain starch fraction which normally comprises the core of the starch granule and has the formula:

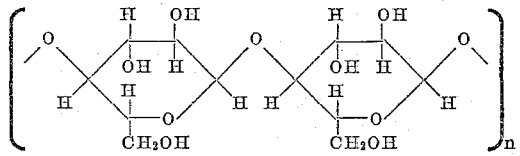

The amylose and amylopectin employed in the present invention are potato starch fractions and while the amylopectin is employed in an unmodified form, the amylose utilized is characterized by hydroxy ethyl ether groups which are attached directly to the starch molecules.

The latter materials are available from Stein, Hall & Co. under the trade designation, Superlose HAA-11.

While the non-ionic lubricants employed are preferably animal or vegetable oils or their hydrogenated derivatives, various other non-ionic lubricants such as the glycols or their esters or derivatives may also be utilized. When the oleagenous materials are utilized, emulsification is preferably facilitated by means of emulsifiers such as polyoxyethylene esters.

The cationic lubricants employed are preferably the condensates of amines and acids such as the fatty acids, e.g., stearic, pelargonic etc. The use of these condensates may be further enhanced through solubilization with acetic acid.

The size compositions of the invention are preferably applied to the fibers, immediately subsequent to their formation by attenuation, by means of an apron applicator such as that disclosed by U.S. 2,873,718. However, any conventional method of contact, immersion or spray application, such as the pad applicators of U.S. 2,390,370 and 2,744,563; transfer rolls such as those disclosed by U.S. 2,693,429 and 2,742,737 or a spray such as those disclosed by U.S. 2,491,889 and 2,846,348, may also be utilized. The application is preferably controlled to achieve the deposition of between 1 and 10% solids upon the strands.

The migration resistant qualities of the size compositions of the invention are aptly demonstrated by the data in the following table, wherein the extent of migration experienced with 5 forming packages (samples 1–5) sized with a conventional dextrinized corn starch based composition, are contrasted with 5 forming packages (samples A–E) sized with the composition of the example of the specifications:

| Sample | Percentage by Weight of Solids Present on Strand Sample Yards Distant From Outside of Package at Which Sample Was Taken | | | | | | | |
|---|---|---|---|---|---|---|---|---|
| | 120 | 240 | 360 | 480 | 500 | 21,600 | 22,600 | 23,600 |
| 1 | 6.56 | 5.67 | 5.92 | 5.61 | 5.05 | 2.42 | 2.45 | 2.44 |
| 2 | 5.72 | 5.33 | 5.20 | 4.79 | 4.31 | 2.33 | 2.19 | 2.15 |
| 3 | 6.49 | 5.91 | 6.04 | 5.71 | 5.40 | 2.42 | 2.38 | 2.51 |
| 4 | 6.43 | 6.08 | 5.36 | 5.28 | 8.77 | 2.48 | 2.48 | 2.49 |
| 5 | 6.15 | 5.49 | 4.89 | 4.62 | 4.66 | 2.22 | 2.21 | 2.20 |
| Average | 6.27 | 5.69 | 5.48 | 5.20 | 5.27 | 2.37 | 2.34 | 2.36 |
| A | 2.17 | 1.91 | 1.93 | 1.89 | 1.74 | 1.60 | 1.58 | 1.57 |
| B | 1.93 | 2.22 | 1.85 | 1.80 | 1.84 | 1.66 | 1.62 | 1.61 |
| C | 1.86 | 1.87 | 1.72 | 1.72 | 1.75 | 1.59 | 1.59 | 1.61 |
| D | 1.96 | 1.71 | 1.85 | 1.69 | 1.63 | 1.48 | 1.49 | 1.50 |
| E | 1.84 | 1.77 | 1.77 | 1.70 | 1.60 | 1.46 | 1.49 | 1.50 |
| Average | 1.95 | 1.89 | 1.82 | 1.74 | 1.74 | 1.56 | 1.55 | 1.56 |

The above data were obtained by drying the sample forming packages, withdrawing the sized strand from the packages and taking strand samples at the eight specified linear intervals which are measured from the exterior of the package or the outside end of the strand. The samples thus obtained were then weighed, subjected to temperatures adequate to decompose the forming size solids deposited upon the strand, and the weight loss resulting from the thermal treatment was recorded as a percentage by weight. This figure is that set forth in the above table and indicates the percentage by weight of size solids which were present upon the strand samples.

It is obvious that the migration experienced in the case of the conventionally sized packages (samples 1–5) was much more extensive than that which occurred in the packages sized with the composition of the invention. For example, there was a 165% average increase in solids from the innermost to the outermost samples of the conventionally sized packages, while the increase was a mere 25% in the case of the packages sized according to the invention, or a 90% decrease in total average solids migration when the materials of the invention were employed.

In addition, the strands sized with the materials of the invention, and yarns plied therefrom, all exhibited the presence of lower fuzz or broken end occurrence and more uniform tension characteristics.

It is apparent that new and unusual forming size compositions and fibrous glass elements sized therewith, which exhibit unusual and desirable characteristics of resistance to size migration and superior processing qualities, are provided by the present invention.

It is further obvious that various changes, alterations and substitutions may be made in the compositions and products of the present invention, without departing from the spirit of the invention as defined by the following claims.

We claim:
1. A migration resistant amylaceous forming size composition for glass fibers, consisting essentially of an aqueous dispersion of between 1 to 5% by weight of amylopectin, between 1 to 5% by weight of hydroxyethylated amylose, between 0.5 to 3% by weight of non-ionic lubricant, and between 0.1 to 2% by weight of cationic lubricant.

2. A forming size composition as described in claim 1 in which said non-ionic lubricant is selected from the group consisting of vegetable oil, animal oil, ethylene glycol and ethylene glycol esters.

3. A forming size composition as described in claim 1 in which said cationic lubricant is the condensate of an amine and a fatty acid.

4. A migration resistant amylaceous forming size composition for glass fibers, consisting essentially of an aqueous dispersion of 2% by weight of amylopectin, 2% by weight of hydroxyethylated amylose, 2% by weight of hydrogenated vegetable oil, 0.2% by weight of polyoxyethylene sorbitan monooleate, 0.5% by weight of tetraethylene pentamine distearate, and 0.5% by weight of polyethylene glycol.

5. Glass fibers coated with the dried residue of an aqueous dispersion consisting essentially of between 1 to 5% by weight of amylopectin, between 1 to 5% by weight of hydroxyethylated amylose, between 0.5 to 3% by weight of non-ionic lubricant and between 0.1 to 2% by weight of cationic lubricant.

6. Glass fibers as described in claim 5 in which said non-ionic lubricant is selected from the group consisting of vegetable oil, animal oil, ethylene glycol and ethylene glycol esters.

7. Glass fibers as described in claim 5 in which said cationic lubricant is the condensate of an amine and a fatty acid.

8. Glass fibers coated with the dried residue of an aqueous dispersion consisting essentially of 2% by weight of amylopectin, 2% by weight of hydroxyethylated amylose, 2% by weight of hydrogenated vegetable oil, 0.2% by weight of polyoxyethylene sorbitan monooleate, 0.5% by weight of tetraethylene pentamine distearate and 0.5% by weight of polyethylene glycol.

References Cited in the file of this patent
UNITED STATES PATENTS

| | | |
|---|---|---|
| 2,245,620 | Steinbock | July 17, 1941 |
| 2,902,336 | Hiemstra et al. | Sept. 1, 1959 |
| 2,993,872 | Gagnon et al. | July 25, 1961 |